United States Patent [19]

Ampela

[11] Patent Number: 5,710,476

[45] Date of Patent: Jan. 20, 1998

[54] ARMATURE DESIGN FOR AN AXIAL-GAP ROTARY ELECTRIC MACHINE

[75] Inventor: Michael J. Ampela, Albany, N.Y.

[73] Assignee: InterScience, Inc., Troy, N.Y.

[21] Appl. No.: 381,359

[22] Filed: Jan. 31, 1995

[51] Int. Cl.$^6$ .................................................. H02K 3/04
[52] U.S. Cl. ........................... 310/268; 310/DIG. 6; 310/264
[58] Field of Search ...................... 310/268, 207, 310/208, DIG. 6, 189, 174, 264

[56] References Cited

U.S. PATENT DOCUMENTS

| | | | |
|---|---|---|---|
| 3,521,091 | 7/1970 | Halas | 310/10 |
| 3,525,007 | 8/1970 | Henry-Baudot | 310/184 |
| 3,719,845 | 3/1973 | Takeda | 310/268 |
| 4,187,441 | 2/1980 | Oney | 310/112 |
| 4,274,020 | 6/1981 | Parsch et al. | 310/13 |
| 4,645,961 | 2/1987 | Malsky | 310/156 |
| 4,677,332 | 6/1987 | Heyrand | 310/184 |
| 4,733,115 | 3/1988 | Barone et al. | 310/184 |
| 4,794,293 | 12/1988 | Fujisaki et al. | 310/268 |
| 5,079,461 | 1/1992 | Schlueter et al. | 310/268 |
| 5,099,162 | 3/1992 | Sawada | 310/184 |

*Primary Examiner*—Thomas M. Dougherty
*Assistant Examiner*—Burt S. Mullins
*Attorney, Agent, or Firm*—Jay R. Yablon

[57] ABSTRACT

An axial gap rotary electric machine in which the conduction path design for disc-shaped armatures is specifically matched to the configuration of the axial magnetic field. The design achieves an axial gap rotary electric machine which is light in weight and capable of high power density per unit weight. The design can be used as an electric generator or an electric motor.

9 Claims, 4 Drawing Sheets

ARMATURE DESIGN FOR AN AXIAL-GAP ROTARY ELECTRIC MACHINE

FIELD OF THE INVENTION

This invention relates broadly to disc-shaped armature design for axial-gap rotary electric machines that can be used as an electric generator or as a motor.

BACKGROUND OF THE INVENTION

Electric machines that convert mechanical power to electric power as generators and, conversely, convert electric power to mechanical power as motors are all based on Faraday's law of induction, which expresses the principle that the electromotive force around a closed loop is equal to the negative of the total time rate of change of magnetic flux density passing through the loop. Although there are a large number of designs of electric machines, the designs differ essentially only in the specific implementation of Faraday's law and in details of construction.

The principal components of an electric machine are a mechanism for generating magnetic flux, which generally comprises either field coils or permanent magnets, and an armature having a conducting path arranged on it for interaction with the magnetic flux according to Faraday's law of induction. Faraday's law applies when there is relative motion between the magnetic flux and the conducting paths on the armature. Axial-gap electric machines refer to a type of rotary electric machine having an axis of rotation which defines an axial direction and in which the effective parts of the conducting paths of the armature extend in a radial direction relative to the axis of rotation and interact with magnetic flux which extends in the axial direction. The axial gap refers to a spacing between the faces of opposing magnetic pole-piece assemblies which generate axial magnetic flux in the gap. The armature of an axial gap electric machine is switched in the axial gap. Generally, for maximum effectiveness in generating magnetic flux in the axial gap, the gap should be as narrow as possible. However, the gap must be wide enough to allow for relative motion between the armature and the magnetic pole-piece assemblies. For this reason, the armature in an axial-gap machine is often in the form of a thin disk on which conductors are arranged according to some scheme for interacting with the magnetic flux in the gap.

Several designs of axial-gap electric machines are known. For example, U.S. Pat. No. 3,3112,846 to Henry-Baudot disclosed a design for a direct-current (DC) motor with a disk armature formed by two layers of conductors in a series-wave pattern on opposite sides of an insulator structure. Other techniques for fabricating an armature of generally similar design by using stamped metal technology are disclosed in U.S. Pat. No. 4,321,499 to Gupta relating to DC motors and in U.S. Pat. No. 4,949,002 to Ibe et al. relating to motors generally. In each of these designs, the conductors are arranged in an azimuthally regular pattern in an azimuthally alternating magnetic field that is non-uniform. As a result of the relative motion of the conducting armature radial segments in the non-uniform magnetic field, the emf and mechanical forces are not balanced, resulting in the generation of eddy currents and acoustic noise that reduces the efficiency of the device and is a substantial drawback in many applications for axial-gap electric machines.

SUMMARY OF THE INVENTION

For use in axial-gap rotary electric machines, I have invented a conduction path design for disc-shaped armatures which is specially matched to the configuration of the axial magnetic field to achieve several objectives:

It is an object of this invention to provide an armature design for an axial-gap rotary electric machine that is light in weight and capable of a high power density per unit weight.

It is also an object of this invention to provide an arrangement for the conduction paths in the armature to reduce the generation of eddy currents, to improve the efficiency, and to reduce acoustic noise.

It is still another object of this invention to allow the armature design to be capable of being mass produced by using printed circuit, by electro-discharge machining (FDM) by automated micro-milling, or by stamping techniques.

It is also an object of this invention to utilize the aforementioned armature design in a narrow-axial gap electric machine that can be used as an electric generator or an electric motor.

It is yet another object of this invention to provide for effective convective cooling of the disc-shaped armature of the axial-gap rotary electric machine.

It is another object of this invention to provide an electric machine with the capability of having a plurality of electric-power taps associated with substantially equal amplitude and phase that can be connected in series or parallel to configure the machine for different voltage and current outputs or inputs.

DETAILED DESCRIPTION OF PREFERRED EMBODIMENTS

Figure 1:
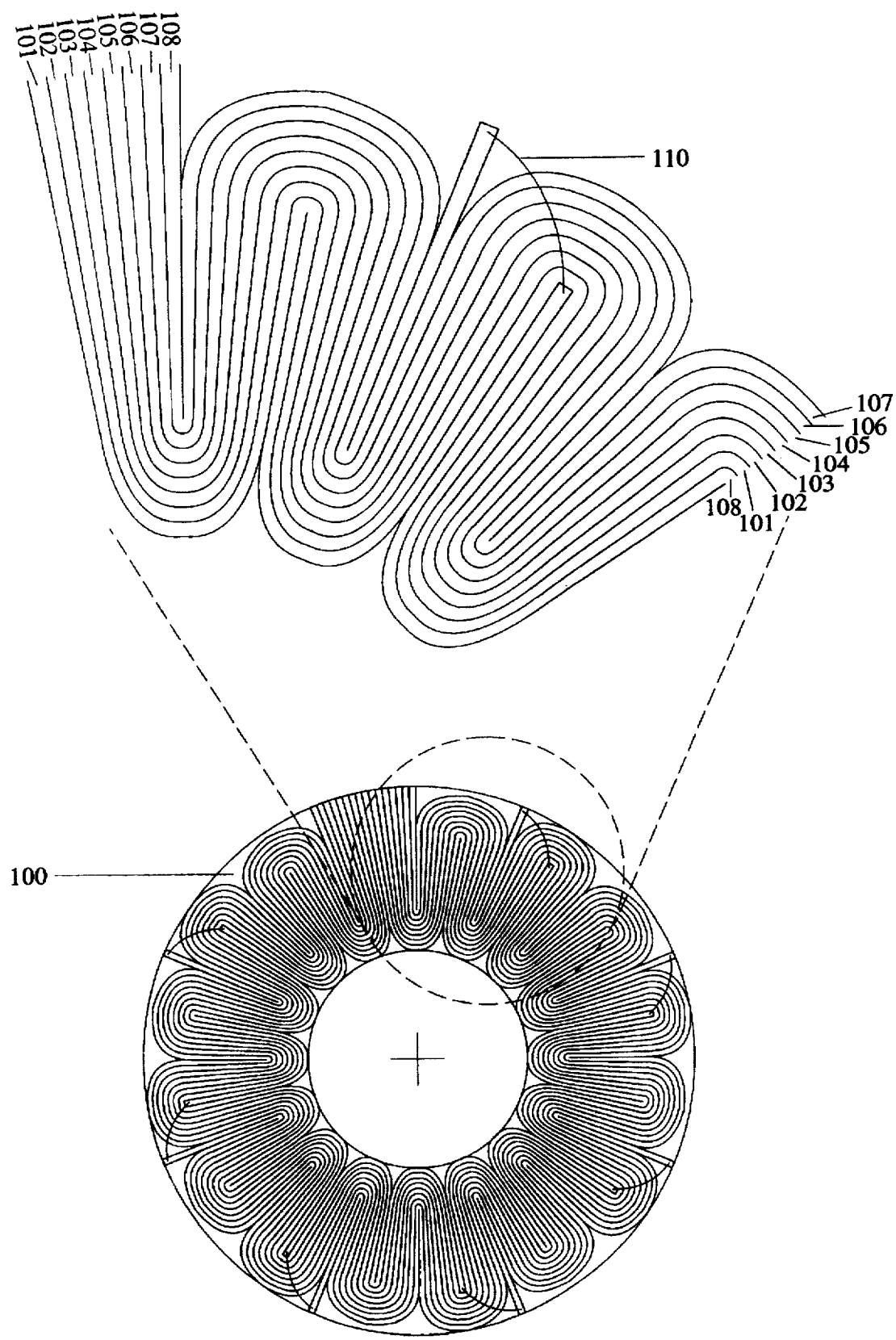
FIG. 1 is a plane view of the disc-shaped armature showing a preferred arrangement of the conduction paths on a face of the armature, with a magnified view of a portion of the conduction path arrangement showing a transposition of the conduction path of the armature.

As shown in FIG. 1, the preferred embodiment of the disc-shaped armature comprises a plurality of conduction paths. As shown in the expanded view in FIG. 1, the eight conduction paths traverse the armature as numbered: 101, 102, 103, 104, 105, 106, 107, 108. As path 101 is followed throughout the design, it is transposed from the first of eight possible locations into the second of eight possible positions. This transposition occurs at the location near the lower part of the jumper 110. Upon exit of the conduction paths shown in the expanded view, it is seen that the ordering of the eight conduction paths has been shifted from "101, 102, 103, 104, 105, 106, 107, 108" to "108, 101, 102, 103, 104, 105, 106, 107". This transposition results in output voltages from each conduction path that are equal in both amplitude and phase. As shown in the preferred embodiment of the nature, there are 8 conduction paths and the transposition occurs a number of times equal to the number of conduction paths minus unity. Consequently 8−1=7 jumpers 110 are needed to provide the desired transpositions of azimuthal locations. The conduction paths may be formed by deposition in etching, by using a masking technique, by machining, or by stamping. The conduction paths may be free standing and self-supporting, or may be bonded onto a supporting insulating substrate 100 as shown in the embodiment in FIG. 1.

Figure 2:
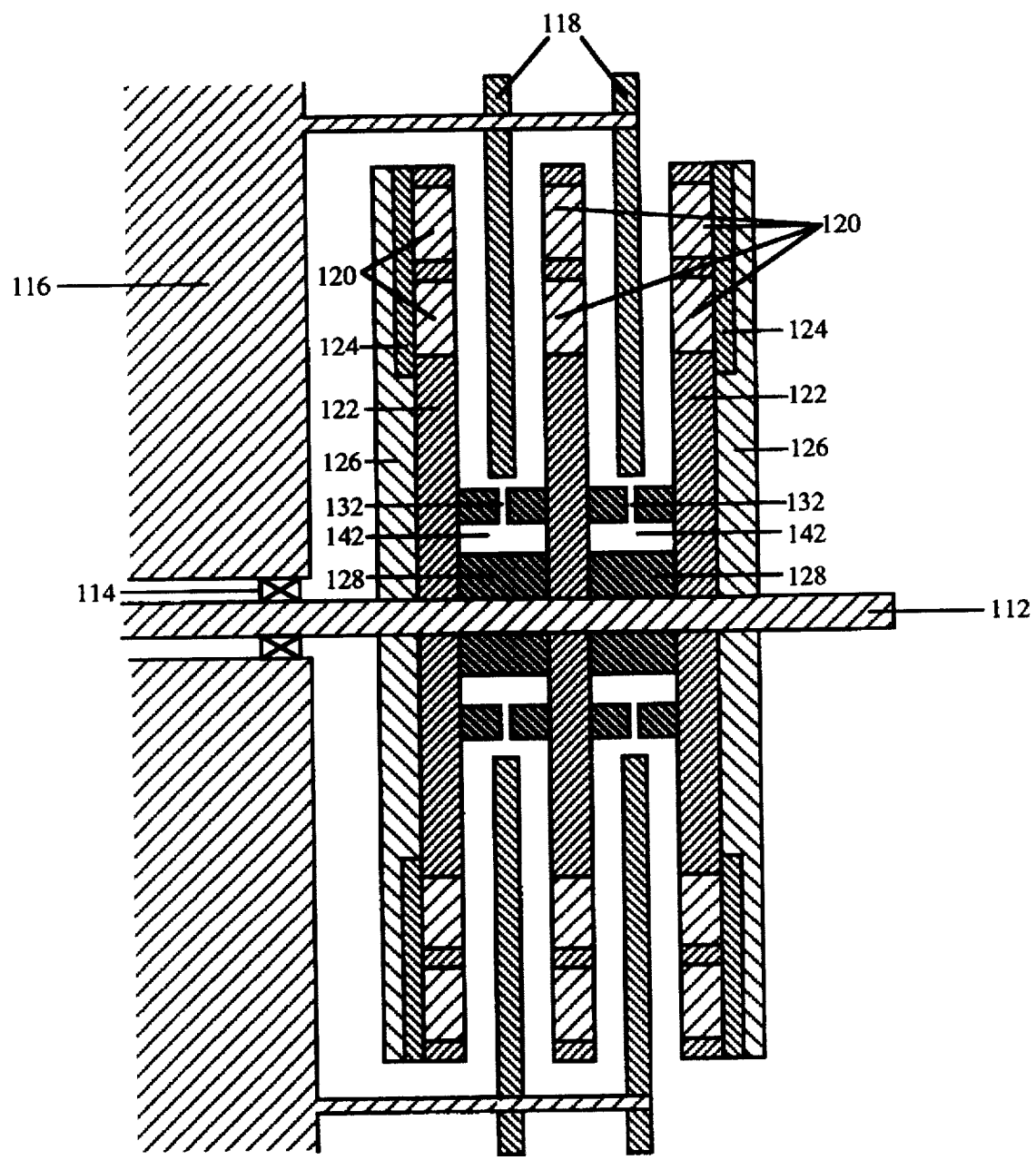
FIG. 2 is a cross-sectional view of a preferred axial-gap electric machine configured to operate with three non-stationary pole-piece assemblies and two stationary disc-shaped armature(s)

FIG. 2 is a cross-sectional view of the configuration of the axial gap electric machine with stationary disc armature(s) and non-stationary pole-piece assemblies. For the purpose of demonstration, this view shows an axial gap electric machine consisting of two stationary disc natures and three pole-piece assemblies. The number of disc armatures and pole-piece assemblies can vary in the proposed design within the set limitations that the number of pole-piece assemblies equals the number of disc armatures plus one, where the number of disc natures is greater than or equal to one. The electric machine housing 116 has a drive shaft 112 which is rotatably supported by a shaft bearing assembly 114. The shaft 112 may be cantilevered as shown in the embodiment in FIG. 2 or supported at both ends. The disc nature(s) 118 are fixedly attached to the machine housing 116. The outermost pole-piece assemblies consist of a set of magnets 120 fixed in a magnet support plate 122. A magnetically soft backing substrate 124 lines the outer faces of the magnet set 120 to concentrate the magnetic flux between the pole-piece assemblies and is fixed in place by the pole-piece support plate 126. The inner pole-piece assemblies require magnetic access to the disc armatures 118 on both faces and consist of only a set of magnets 120 fixed in a magnet support plate 122. Depending on the shape of the magnets, they are to be arranged in azimuthal radial sectors of alternating polarity. The layout of the set of magnets 120 on the magnet support plate 122 is further detailed in FIG. 4. The pole-piece support hub assembly 128 fixedly attaches the pole-piece assemblies to the drive shaft 112. The pole-piece support hub assembly 128 has radial ventilation opening 132 connected to the shaftway openings 142. The pole-piece assemblies can be secured to the pole-piece hub assembly by a variety of adhesive materials, bolts, pins or any other common joining method.

Figure 3:
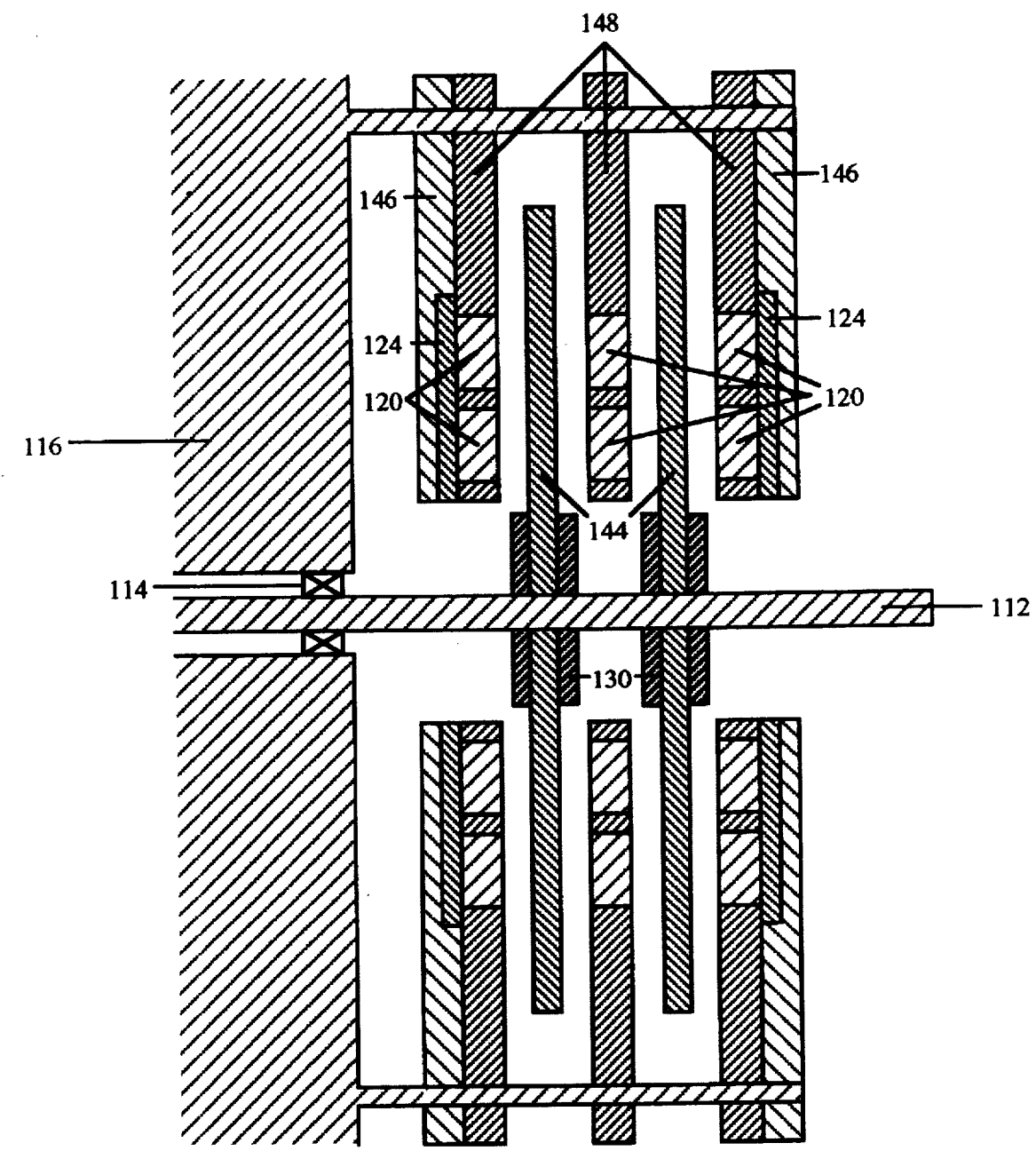
FIG. 3 is a cross-sectional view of an alternative preferred rotary axial-gap electric machine configured to operate with two non-stationary armature(s) and three stationary pole-piece assemblies.

FIG. 3 is a cross-sectional view of the configuration of the axial gap electric machine with stationary pole-piece assemblies and non-stationary disc armatures. As in FIG. 2, this view shows an axial gap electric machine consisting of two disc armatures and three pole-piece assemblies for demonstration purposes only. The number of alternating stationary and rotating discs in tandem depends on the power requirements of the application and must comply to the set design limitations that the number of polepiece assemblies equals the number of disc armatures plus one, where the number of disc armatures is greater than or equal to one. The electric machine housing 116 has a drive shaft 112 which is rotatably supported by a shaft bearing assembly 114. The outermost pole-piece assemblies consist of a set of magnets 120 fixed in a magnet support plate 148. A magnetically soft backing substrate 124 lines the outer faces of the magnets 120 and is fixed in place by the pole-piece support plate 146. The inner pole-piece assemblies require magnetic access to the disc armatures 144 on both faces. Therefore the inner pole-piece assemblies consist of a set of magnets 120 fixed in a magnet support plate 148. The layout of the set of magnets 120 on the magnet support plate 148 is further detailed in FIG. 4. All of the pole-piece assemblies are fixedly attached to the machine housing 116. The armature hub support assembly 130 fixedly attaches the disc armature(s) 144 to the drive shaft 112.

Figure 4:
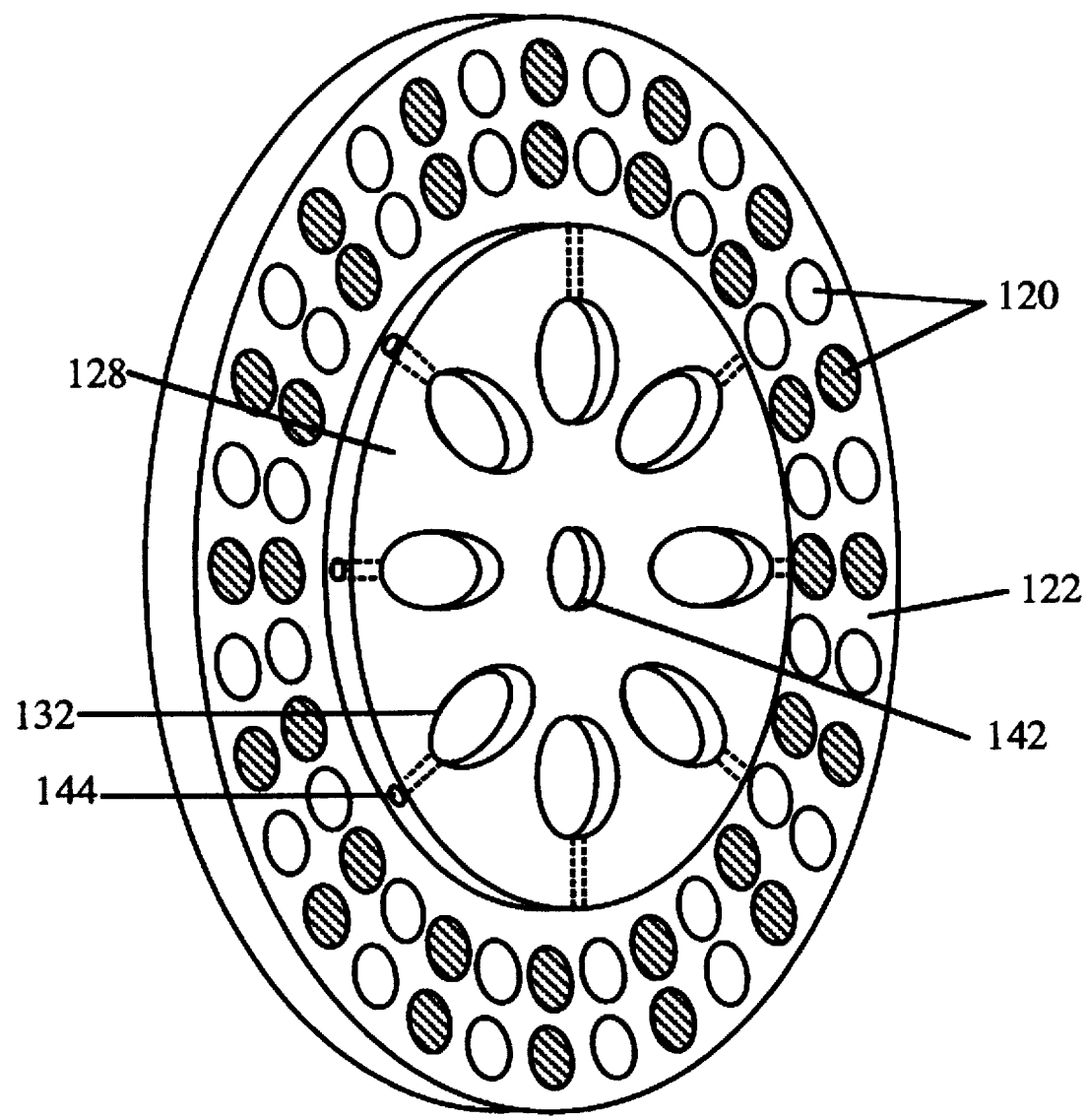
FIG. 4 is a perspective view of a possible design of the pole-piece assemblies to be used in the axial gap electric machine.

FIG. 4 is a perspective view of a pole-piece assembly and the associated polepiece hub assembly 128. This specific view is of an interior pole-piece for the axial gap electric machine design with stationary armatures and non-stationary pole-piece assemblies. The actual pole-piece assembly for the alternative axial gap electric machine design is identical in layout, but does not require the associated hub assembly since it is secured to the machine housing at its perimeter. FIG. 4 shows the magnet layout design in the preferred embodiment of the axial gap electric machine invention. In the embodiment illustrated in FIG. 4, circular disc shaped magnets are shown. Other magnet shapes, such as rectangular or trapezoidal for example, that can be arranged in a radial fashion around the drive shaft. The magnets 120 are secured in the magnet support plate 122 which is secured to the pole-piece hub assembly 128 by means of adhesive, bolts, or any other common means of joining. The pole-piece hub assembly 128 has a shaftway opening 142 passing through its center axis and a plurality of ventilation openings 132 through the pole-piece hub assembly 128 spaced radially outward from the central shaftway opening 142. The ventilation openings 132 have radial outlets 144 to the perimeter of the pole-piece hub assembly.

An object of the design for the armature, as shown in FIG. 1, is to require that each of the radial conducting paths corresponds one-to-one with each of the plurality of output. In this way, the magnetic flux density integrated over any given conduction path will produce output voltages identical to those produced by the integration of the magnetic flux density over any other conduction path. As an example, in our preferred embodiment of the armature design, there are eight independent conduction paths. Since all of the conduction paths produce essentially identical waveforms, they may be connected either in parallel or in series to match the external source or load requirements. This often a distinct advantage over designs featuring multiple outputs that are not matched in amplitude and or phase since the input (or output) taps for these designs cannot be connected in parallel.

A number of different technologies can be used for the manufacturing of the disc-shaped armature. In one preferred embodiment, the armature can be manufactured by using established printed circuit technology in which the desired conducting path is formed by etching through a mask on a copper foil bonded to an insulating substrate material to remove unwanted conducting material. An analogous approach can be used for depositing a layer of materials with special electrical conductivity properties such as high temperature superconductors by using thin film deposition techniques that can result in a superconducting electrical machine. The principal advantage of these two approaches is the high degree of control on the dimensions of the conduction path. The conduction path can also be stamped from a sheet of conducting material and then bonded it to the insulator material. It is also possible to use a computer guided micro-milling machine to remove unwanted parts of the metal sheet bonded to the insulating substrate. The armature can also be mass produced in a batch process by using electro-discharge machining (EDM).

In the case where the axial-gap electric machine is applied as a generator, the terminals connecting the armature to the load are referred to as "output" terminals, while in the case where the invention is applied as a motor, the terminals connecting the armature to the power source are referred to as "input" terminals. For the purposes of simplicity, the following description refers specifically to the application of the invention as a generator. Replacing the words "generator," "output," and "load" used in the following descriptions with the words "motor," "input," and "power source," respectively, will describe the invention applied as a motor.

In operation, the armature and pole-piece assembly shown in FIGS. 1 and 4 respectively, are representative of those used in the two design variations of the axial gap electric machine as shown in FIGS. 2 and 3. In FIG. 2 the layout and design of an axial gap electric machine with stationary armature(s) and non-stationary rotating polepiece assemblies is presented. As the drive shaft with integral pole-piece assemblies is rotated the conduction paths on the stationary armature experiences a changing magnetic field each time the magnetic field changes during each revolution. The changing magnetic field induces electric potential in the radial portion of the conduction path of the armature. In each revolution this electric potential would alternate with each change in magnetic polarity. In the specific embodiment in which the exact magnetic layout shown in FIG. 4 is used, the electric potential would alternate 32 times per revolution since there are 32 radial magnetic segments of the pole-piece assembly. As a result the AC potential is generated at the output taps of the conduction paths. Conversely, this configuration can be used as an electric motor in which input to the conduction paths from a power source with a voltage synchronous to the rotational motion would create the necessary force in the electric machine. In FIG. 3 the layout and design of the axial gap electric machine with stationary armature(s) and non-stationary pole-piece assemblies is presented. The rotation of the armatures in conjunction with the drive shaft causes the conduction paths of the armature to intersect the alternating magnetic fields created by the magnets in the pole-piece assemblies and thereby generate electromechanical power conversion based on Faraday's law of induction. Brushes can be used in a variety of configurations and positions in order to make the electrical connection between the armature conductors output and the load for the generator configuration, and between the armature inputs and the power source for the electric motor configuration.

Since the magnetic field in the region occupied by the armature is in the axial direction and the relative motion is in the azimuthal direction, emf is induced in both the radial direction and in a circulating fashion in order to cancel the applied field in accordance with Lenz's law. It is an object of the current axial gap electric machine to harness the radial component of the conduction path to minimize the circulating eddy current losses and, where the invention is applied as a generator, to produce useful output voltage and current, or, where the invention is applied as a motor, to produce useful output torque. Conduction paths in the azimuthal direction, however, are necessary to connect the mostly radial potions of the path appropriately such that the emf's generated in each of these radial segments are added together constructively. Where such interconnects are topologically impossible in two dimensions, jumpers can be implemented by using actual wire or by using additional armature layers with provisions for the desired connections. Similarly, when multiple layers are used to increase the current carrying capacity of the armature, the jumpers can connect to the radial elements in all layers of the armature through holes filled with conducting material, more commonly known in the printed circuit industry as "vias". Because only the radial portions of the conducting paths contribute to the generation of useful emf in the presence of the axial magnetic field, the magnetic pole-piece assemblies need not extend beyond the radial portions of the conduction paths on the armature(s). Conversely, the magnetic field needs to cover only an annular region that corresponds to the radial portions of the conduction paths on the armature(s). Transpositions made at intervals around the face of the armature tend to achieve a substantially uniform current and induced voltage distribution in the armature conduction paths to minimize eddy currents and reduce acoustic noise and torque ripple.

The terms and expressions which have been employed are used as terms of description and not of limitation, and there is no intention, in the use of such terms and expressions of excluding any equivalent of the features shown or described or portions thereof, but it is recognized that various modifications are possible within the scope of the invention claimed.

What is claimed is:

1. An armature for an axial gap rotary machine comprising a plurality of substantially radial conducting paths on an armature face, where each of said plurality of radial conducting paths are adjacent electrically isolated from one another, and each of the conducting paths traverse said armature face in a radially serpentine fashion and are substantially equal in length to one another by occupying incremental path positions so as to occupy every path position once in traversal of said armature face without overlapping other said conducting paths.

2. An armature as in claim 1 where said conducting paths are formed by means of standard printed circuit board technology.

3. An armature as in claim 1 where said conducting paths are formed by depositing a conducting material of appropriate pattern onto a dielectric substrate of insulating material wherein the deposited material includes a high temperature superconducting material deposited by means of thin film deposition techniques.

4. An armature as in claim 1 where said conducting paths are formed by stamping from a sheet of a conducting material.

5. An armature as in claim 1 where said conducting paths are formed by a means of computer guided cutting or forming on techniques a series of 1 or more layers of the conducting material.

6. An axial gap rotary electric generator, including one or more armatures, comprising:
   (a) a drive shaft rotatably mounted in a machine housing, with said drive shaft being positioned and oriented to rotate about a drive axis;
   (b) a plurality of magnetic pole-piece assemblies, equal to an integer R, with each of said magnetic pole-piece assembly including a magnet support plate and an even-numbered plurality of permanent magnets with the permanent magnets spaced at intervals in alternating polarity on said magnet support plate around said drive axis in a generally uniform annular array;
   (c) a plurality of substantially radial conducting paths on an armature face, where each of said plurality of radial conducting paths are adjacent and electrically isolated from one another, and each of the conducting paths traverse said armature face in a radially serpentine fashion and are substantially equal in length to one another by occupying incremental path positions so as to occupy every path position once in traversal of said armature face without overlapping other said conducting paths;
   (d) means of integrating said plurality of magnetic pole-piece assemblies with said machine housing, with the plurality of magnetic pole-piece assemblies being positioned in substantially axial alignment with said drive axis and spaced apart from one another in the axial direction in order to define an axial gap between the consecutive magnetic pole-piece assemblies in said plurality of magnetic pole-piece assemblies, and where said plurality of magnetic pole-piece assemblies are substantially oriented azimuthally relative to the plurality of permanent magnets in pole-face to pole-face alignment across said axial gap; and (e) means of integrating a number of said armatures, equal to R-1, with said machine housing with the center line axis of said armature(s) being positioned in substantially axial alignment with said drive axis, and with said armature(s) being positioned within said axial gap substantially equidistant from said consecutive magnetic pole-piece assemblies.

7. An axial gap electric generator as in claim 6 with a set of ventilation openings located on or near said drive shaft and/or said pole-piece assemblies such that natural ventilation can occur due to radial flow induced by the rotational motion of said pole-piece assemblies.

8. An axial gap rotary electric motor including one or more armatures comprising:

(a) a drive shaft rotatably mounted in a machine housing, with said drive shaft being positioned and oriented to rotate about a drive axis; and (b) a plurality of magnetic pole-piece assemblies, equal to an integer R, with each said magnetic pole-piece assembly including a magnet support plate and an even-numbered plurality of permanent magnets with the permanent magnets spaced at intervals in alternating polarity on said magnet support plate around said drive axis in a generally annular array; and (c) a plurality of radial conducting paths on an armature face, where each of said plurality, radial conducting paths are adjacent and electrically isolated from one another, and each of the conducting paths traverse said armature face in a radially serpentine fashion and are substantially equal in length to one another by occupying incremental path positions so as to occupy every path position once in traversal of said armature face without overlapping other said conducting paths;

(d) means of integrating said plurality of magnetic pole-piece assemblies with said machine housing, with the plurality of magnetic pole-piece assemblies being positioned in substantially axial alignment with said drive axis and spaced apart from one another in the axial direction in order to define an axial gap between the consecutive magnetic pole-piece assemblies in said plurality of magnetic pole-pie assemblies, and where said plurality of magnetic pole-piece assemblies are substantially oriented azimuthally relative to the plurality of permanent magnets in pole-face to pole-face alignment across said axial gap; and (e) means of integrating a number of said armatures, equal to R-1, with said machine housing with the center line axis of said armature(s) being positioned in substantially axial alignment with said drive axis, and with said armature(s) being positioned within said axial gap substantially equidistant from said consecutive magnetic pole-piece assemblies.

9. An axial gap electric motor as in claim 8 with a set of ventilation openings located on or near said drive shaft and/or said pole-piece assemblies such that natural ventilation can occur due to radial flow induced by the rotational motion of said pole-piece assemblies.

* * * * *